(12) United States Patent
Springer

(10) Patent No.: US 10,060,505 B2
(45) Date of Patent: Aug. 28, 2018

(54) DEVICE FOR SECURING BALANCING WEIGHTS TO A SHAFT

(71) Applicant: Dana Automotive Systems Group, LLC., Maumee, OH (US)

(72) Inventor: Stephen Springer, Monroe, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 93 days.

(21) Appl. No.: 15/068,022

(22) Filed: Mar. 11, 2016

(65) Prior Publication Data

US 2017/0261066 A1    Sep. 14, 2017

(51) Int. Cl.
| | |
|---|---|
| F16C 3/02 | (2006.01) |
| F16F 15/34 | (2006.01) |
| F16F 15/32 | (2006.01) |

(52) U.S. Cl.
CPC ............ *F16F 15/34* (2013.01); *F16F 15/322* (2013.01); *F16C 3/02* (2013.01); *Y10T 464/50* (2015.01)

(58) Field of Classification Search
CPC ....... F16F 15/34; F16F 15/322; Y10T 464/50; F16C 3/02
USPC ........................... 464/180; 188/378; 301/5.21
See application file for complete search history.

(56) References Cited

U.S. PATENT DOCUMENTS

| | | | |
|---|---|---|---|
| 1,352,005 A | | 9/1920 | Larsson |
| 2,370,361 A | * | 2/1945 | Le Jeune ............... F16F 15/324 301/5.21 |
| 2,734,395 A | | 2/1956 | Fawick |
| 3,052,107 A | * | 9/1962 | Kempf ..................... F16F 15/10 464/180 |
| 4,014,184 A | * | 3/1977 | Stark ....................... B23P 19/02 464/180 X |
| 4,043,147 A | | 8/1977 | Wiebe |
| 4,235,184 A | * | 11/1980 | Schiavone .......... B60C 23/0408 |
| 4,895,551 A | | 1/1990 | Fritz |
| 4,926,710 A | | 5/1990 | Novotny |
| 6,463,827 B1 | | 10/2002 | Oetiker |
| 6,966,839 B2 | | 11/2005 | Tomonelli |
| 8,562,449 B2 | | 10/2013 | Streather et al. |
| 2004/0090109 A1 | | 5/2004 | An |

* cited by examiner

*Primary Examiner* — Greg Binda
(74) *Attorney, Agent, or Firm* — Marshall & Melhorn, LLC

(57) ABSTRACT

A shaft balancing device for insertion into a shaft including a generally flat cylindrical band having an outer surface, an inner surface and a set of two crush points thereon. A balancing weight is attached to the outer surface of the band between the set of crush points. The device is inserted into the shaft and the crush points are plastically deformed radially outward creating spring force which holds the balancing weight to the inner surface of the shaft. The band has a curved connecting portion between the two crush points having a radius of curvature slightly greater than the curvature of the shaft. The balancing weight has a radius of curvature slightly greater than the radius of curvature of the curved connecting portion and slightly less than the radius of curvature of the shaft.

9 Claims, 4 Drawing Sheets

DEVICE FOR SECURING BALANCING WEIGHTS TO A SHAFT

FIELD OF THE INVENTION

The present invention relates to a device for securing balancing weights to the inside surface of a shaft. More specifically, this invention relates to an improved device for securing balancing weights to the inside surface of a shaft used in the assembly of a driveshaft.

BACKGROUND OF THE INVENTION

Motor vehicle drivetrain assemblies typically include a tubular driveshaft and one or more axles. Balancing the driveshaft aids in improving the overall performance of the drivetrain assembly. An unbalanced driveshaft can induce vibrations and noise in the drivetrain assembly. Reducing or removing excessive vibrations and noise in the driveshaft contributes to increased life of the components of the driveshaft and drivetrain assembly.

Driveshafts are preferably manufactured from tubing in the shape of a perfectly round cylinder having a uniform wall thickness throughout. A perfectly shaped driveshaft tube would be precisely balanced for rotation and would not generate any undesirable noise or vibration during use. However, the cost of a driveshaft made from materials with uniform wall thickness is often prohibitive. Lower cost commodity materials can be used to control overall costs of driveshafts; however, using such materials will often result in excessive variations in wall thickness, etc. This variation creates a difference in the mass radially around the driveshaft creating an excessive static imbalance. When this driveshaft is built into a drivetrain assembly, the static imbalance causes the assembly's dynamic balance to be excessive.

To prevent such unbalances from generating undesirable noise or vibration balancing weights are often used to counteract such imbalances. The balancing weights are sized and attached to selected portions of the driveshaft tube to balance the rotation during use.

A need exists for a device and method to balance driveshafts prior to using the shafts in other drivetrain assemblies which decreases the static imbalance of the shaft and, therefore, decreases the initial dynamic imbalance of the driveshaft assembly.

SUMMARY OF THE INVENTION

A shaft balancing device for insertion into a shaft including a generally flat cylindrical band having an outer surface, an inner surface and a set of two crush points thereon. The outer diameter of the band is slightly smaller than the inner diameter of the shaft it is inserted into. A balancing weight is attached to the outer surface of the band between the two crush points. The crush points project radially inward from the inner surface of the band and can be plastically deformed radially outward bringing the two ends of the band in contact creating a spring force which holds the balancing weight to the inner surface of the shaft. The band has a curved connecting portion between the two crush points with a radius of curvature slightly smaller than the curvature of the shaft. The balancing weight has a radius of curvature slightly greater than the radius of curvature of the curved connecting portion and slightly smaller than the radius of curvature of the shaft.

The generally flat cylindrical band can be formed by rolling a generally rectangular flat band into a cylinder with a diameter less than the diameter of the unbalanced shaft. The generally flat cylindrical band is placed inside the shaft and then released allowing the outer surface of the band to make contact with the inner surface of the shaft. The crush points are then deformed radially outward supplying a spring force to hold the balancing weight in place in the shaft.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

The present invention relates to a device for securing balancing weights to the inside surface of a shaft.

Figure 1:
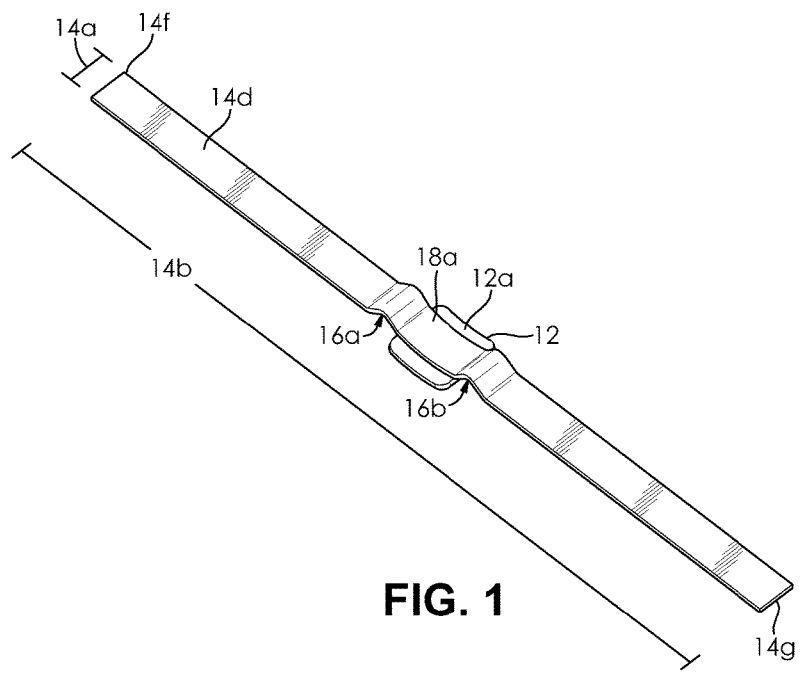
FIG. 1 is a perspective view of the shaft balancing device in accordance with a preferred embodiment of the invention.
Figure 2:
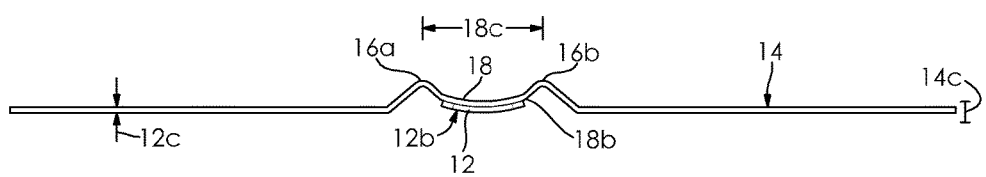
FIG. 2 is a side view of the shaft balancing device of FIG. 1.

Referring now to FIGS. 1-2, a shaft balancing device 10 includes a balancing weight 12 secured to a band 14. Band 14 is a generally flat band made from plastically deformable material including, but not limited to, spring steel. The dimensions of band 14 can be chosen to suit a particular application such that band 14 can be inserted into a shaft. In one preferred embodiment, as shown in FIGS. 1-2, band 14 is generally rectangular in shape having a width 14a, a length 14b and a thickness 14c. The thickness 14c of band 14 is uniform throughout band 14. Preferably, thickness 14c is relatively small compared to the thickness of the unbalanced shaft it is being inserted into. In one preferred embodiment, band 14 is 20.5 inches long, 1 inch wide and 0.015 inches thick.

Figure 3:
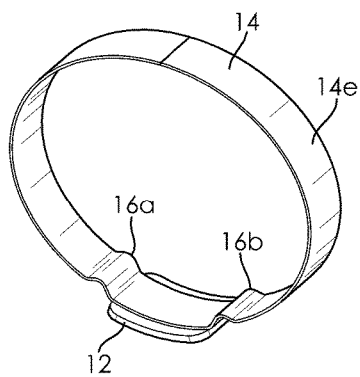
FIG. 3 is a perspective view of the shaft balancing device in a cylindrical formation in accordance with a preferred embodiment of the invention.

As shown in FIGS. 1-3, band 14 has an inner surface 14d and an outer surface 14e. Balancing weight 12 is attached to the outer surface 14e of band 14. In one preferred embodiment, balancing weight 12 is welded to the outer surface 14e of band 14. In other embodiments, balancing weight 12 can be attached using mechanical means such as using fasteners or staking or secured through the use of adhesive. Balancing weight 12 can be made to any predetermined weight and size as needed in a particular application. Balancing weight 12 may be made of any known material suitable for an application including, but not limited to high density metals including steel, brass or copper and aluminum or plastic. In one preferred embodiment balancing weight 12 is substantially square in shape and has inner surface 12a and outer surface 12b. Balancing weight 12 is welded to band 14 such that the outer surface 14e of band 14 is in contact with the inner surface 12a of balancing weight 12. In one preferred embodiment, balancing weight 12 has a width and/or length that is larger than the width of band 14 such that balancing weight 12 extends beyond the width 14a of band 14 as shown in FIGS. 1-2. In one preferred embodiment balancing weight 12 has a thickness 12c that is larger than the thickness 14c of band 14.

Figure 8:
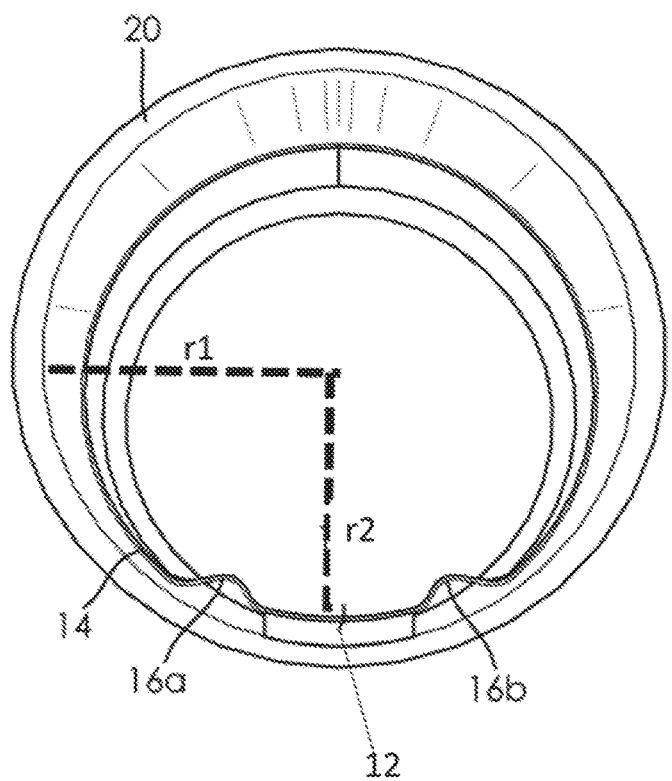
FIG. 8 is a top view of the shaft balancing device of FIG. 3 inside the shaft after deformation of the crush points.

As shown in FIGS. 1-3, inner surface 12a of balancing weight 12 has a concave curved surface. The radius of the curvature provided by the concave inner surface 12a is such that when band 14 is rolled to form a cylinder and placed inside a shaft, the radius of curvature of balancing weight 12 (r2) is slightly smaller than the radius curvature of the shaft (r1) allowing the outer surface 12b of balancing weight 12 to contact the inner surface the shaft as shown in FIG. 8.

Referring now to FIGS. 1-2, band 14 has a set of two crush points 16a, 16b formed therein protruding upward from the inner surface 14d of band 14. Crush points 16a, 16b are positioned along band 14 such that balancing weight 12 is attached to band 14 between crush points 16a, 16b. Crush points 16a, 16b can be of any shape or size as needed in a particular application as to provide a surface which can be deformed when a force is applied thereto and when deformed increases an "effective length" of band 14 to a length greater than the actual length 14b. As used herein, the term "effective length" refers to length of band 14 if unrolled when crush points 16a, 16b are deformed. For example, in one preferred embodiment the length of band 14 is 20.5 inches as shown in FIGS. 1-2. When crush points 16a, 16b are deformed the "effective length" of band 14 is greater than 20.5 inches bringing ends 14f, 14g of band 14 into contact with one another and, thus, forcing the outer surface 14e of band 14 radially outward against the inner surface of a shaft 20 as shown in FIG. 8. In one preferred embodiment, crush points 16a, 16b are peaks as shown in FIGS. 1-2.

The portion of band 14 between crush points 16a, 16b is a curved connecting portion 18. The curvature of connecting portion 18 matches the curvature of the inside surface 12a of balance weight 12. Curved connecting portion 18 has an inner surface 18a, outer surface 18b and a length 18c as shown in FIGS. 1-2.

Figure 9:
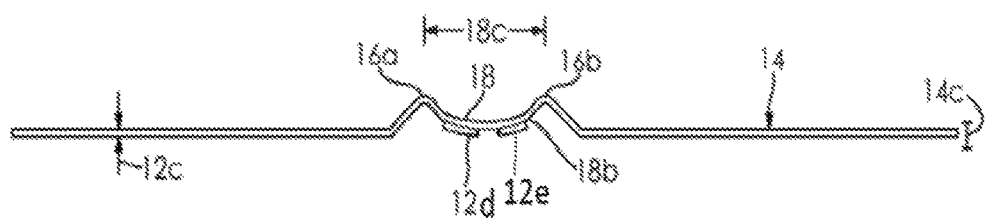
FIG. 9 is a side view of another preferred embodiment of a shaft balancing device.

As shown in FIGS. 1-4, in one preferred embodiment band 14 has a single balancing weight 12 attached thereto. In certain embodiments, more than one balancing weight 12 can be added to band 14 to counteract imbalances in a shaft. In one preferred embodiment, as shown in FIG. 9 the additional balance weights 12d,e can be added to curved connecting portion 18 between crush points 16a, 16b. The length 18c of curved connecting portion 18 is longer than the total length of the balance weights 12.

Figure 4:
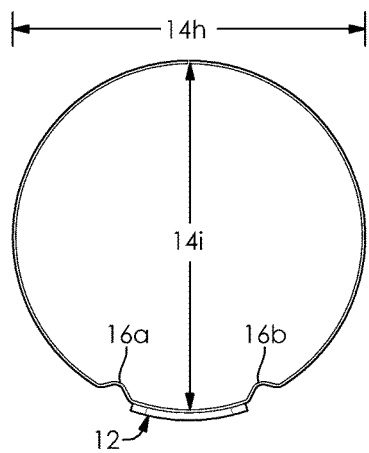
FIG. 4 is a top view of the shaft balancing device of FIG. 3.

Referring now to FIG. 1, band 14 has two ends 14f, 14g on each end thereof. Band 14 can be rolled such that ends 14f, 14g meet creating a generally cylindrical shape as shown in FIGS. 3-4. The cylindrical shaped band 14 has a maximum diameter 14h. Curved connecting portion 18 provides band 14 with a second diameter 14i as shown in FIG. 4. The difference between maximum diameter 14h and second diameter 14i is equal to the thickness 12c of balancing weight 12.

When band 14 is rolled such that ends 14f, 14g of band 14 overlap, band 14 forms a cylindrical shape such that the maximum outer diameter 14h of band 14 is smaller than the inner diameter of shaft 20 which band 14 is to be positioned inside.

Figure 5:
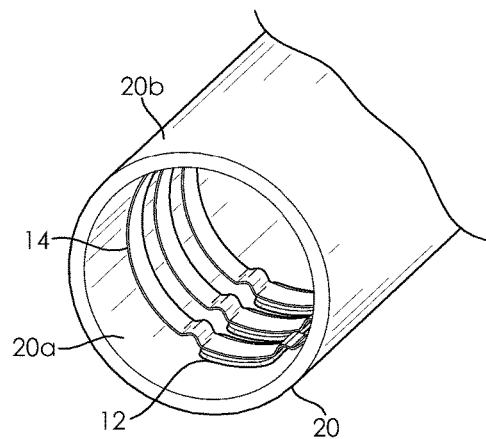
FIG. 5 is a perspective view of multiple shaft balancing devices inside the shaft in accordance with the invention.
Figure 6:
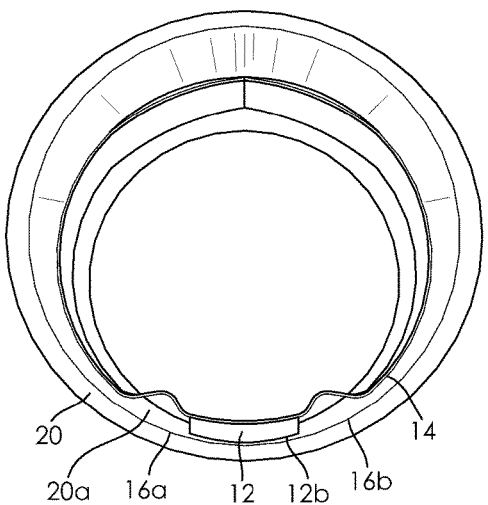
FIG. 6 is a top view of the shaft balancing device of FIG. 3 inside the shaft in accordance with an embodiment of the invention.

Shaft 20 has an inner surface 20a and outer surface 20b. To insert band 14 into a shaft 20, band 14 is rolled to form a generally cylindrical shape having a maximum outer diameter 14h is smaller than diameter of the inner surface 20a of shaft 20 and then inserted into shaft 20. Band 14 can be positioned inside shaft 20 in any position as needed to counterbalance the imbalances in shaft 20. As shown in FIG. 5, more than one band 14 can be placed inside shaft 20 if needed to balance shaft 20. Once band 14 is inserted into shaft 20, band 14 can be released allowing the outer surface 14e band 14 to contact inner surface 20a of shaft 20 as shown in FIG. 6. When band 14 is released, ends 14f, 14g are aligned with one another and a small gap may exist between ends 14f, 14g.

Figure 7:
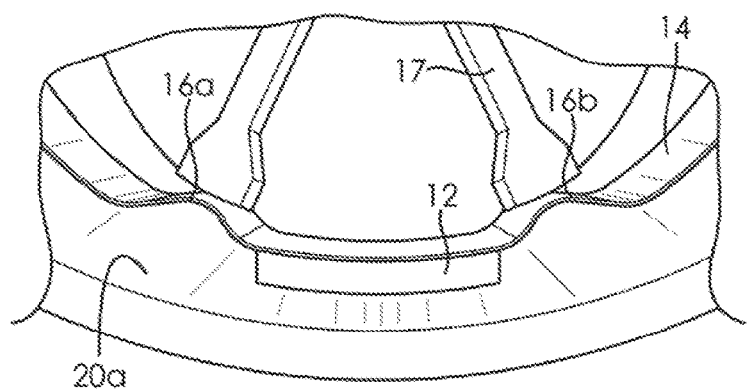
FIG. 7 is a side view of the shaft balancing device of FIG. 3 inside the shaft showing a detailed view of the crush points and balancing weight.

To provide a more secure connection between balance weight 12 and inner surface 20a of shaft 20, crush points 16a, 16b can be plastically deformed by applying a force downward toward the inner surface 20a of shaft 20 elongating band 14. Prior to applying a force to crush points 16a, 16b, a gap may exist between the outer surface 12b of balancing weight 12 and the inner surface 20a of shaft 20 as shown in FIG. 6. By deforming crush points 16a, 16b a maximum outward spring force is created on inner surface 20a of shaft 20 forcing the outer surface 12b of balance weight 12 to make contact with the inner surface 20a of shaft 20 as shown in FIGS. 7-8. During deformation, ends 14f, 14g of band 14 meet. The spring force holding balancing weight 12 in place is sufficient under low loads and speeds to hold balancing weight 12 to the inner surface 20a of shaft 20. FIG. 7 depicts a tool 17 applying a force to crush points 16a, 16b creating a maximum outward spring force.

However, under high loads and speeds the spring force created by the deformation of the crush points 16a, 16b may not be sufficient to hold balancing weight 12 in place against the inner surface 20a of shaft 20 and additional means of attachment may be needed. In one preferred embodiment, band 14 is further secured to the inner surface 20a of shaft 20 using an adhesive. The adhesive is applied to the outer surface 14e of band 14 prior to placement in shaft 20. The adhesive material may be any desired adhesive material including epoxies. In another preferred embodiment, band 14 can be fastened to the inner surface 20a of shaft 20 by mechanical means including, but not limited to staking. In another preferred embodiment, a coating can be applied to shaft 20 and band 14 after insertion of band 14 into shaft 20 to seal and adhere band 14 to inner surface 20a of shaft 20. The coating can be, but is not limited to, an atomized ultraviolet light curing material.

As shown in FIG. 5, additional bands 14 can be inserted into shaft 20 and positioned as needed to counter balance the imbalance of shaft 20. As previously discussed, in certain embodiments, band 14 can also include more than one balancing weight 12 and be positioned in shaft 20 to counter balance the imbalance of shaft 20 as required for a particular application.

In accordance with the provisions of the patent statutes, the present invention has been described in what is considered to represent its preferred embodiments. However, it should be noted that the invention can be practiced otherwise than as specifically illustrated and described without departing from its spirit or scope.

I claim:

1. A shaft balancing device comprising:
    a generally flat cylindrical band having an outer surface, an inner surface, a set of two crush points therein and an outer diameter slightly smaller than the inner diameter of a shaft;
    a balancing weight wherein the balancing weight is attached to the outer surface of the band between the two crush points; and
    wherein the crush points project radially inward from the inner surface of the band and can be plastically deformed outward.

2. The shaft balancing device of claim 1, where in the band further comprises a curved connecting portion between the set of two crush points.

3. The shaft balancing device of claim 2, wherein the balancing weight has a curved inner surface and curved outer surface with a radius of curvature smaller than the radius of curvature of the shaft.

4. The shaft balancing device of claim 1, wherein the band is made of spring steel.

5. The shaft balancing device of claim 1, wherein the balancing weight is made of steel.

6. The shaft balancing device of claim 1, wherein the thickness of the band is less than the thickness of the balancing weight.

7. The shaft balancing device of claim 1, wherein the balancing weight is attached to the outer surface of the band by welding.

8. The shaft balancing device of claim 1, further comprising at least one additional balancing weight wherein the additional balancing weight is attached to the outer surface of the band on the curved connecting portion between the crush points.

9. A balanced shaft assembly, comprising a shaft and shaft balancing device including:
    a generally flat cylindrical band having an outer surface, an inner surface, a set of two crush points therein and an outer diameter slightly smaller than the inner diameter of a shaft;
    a balancing weight wherein the balancing weight is attached to the outer surface of the band between the two crush points;
    wherein the crush points project radially inward from the inner surface of the band and can be plastically deformed outward; and
    wherein the shaft balancing device is positioned inside the shaft.

\* \* \* \* \*